(No Model.) 3 Sheets—Sheet 2.
G. W. DORRANCE.
REVERSIBLE GATE FOR WATER WAYS.
No. 489,557. Patented Jan. 10, 1893.
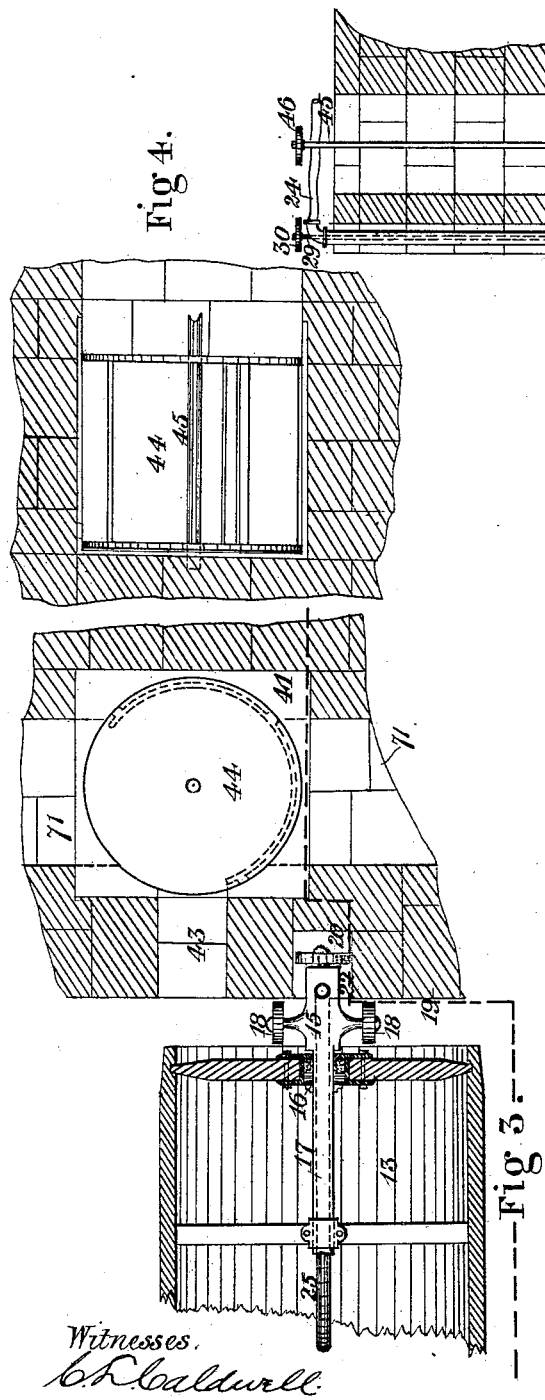
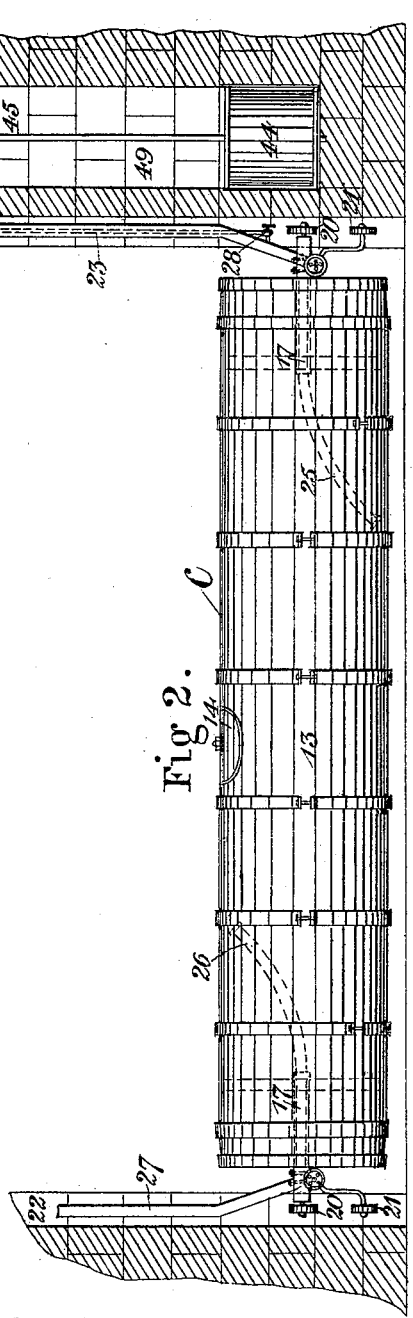
Witnesses.
Inventor
George W. Dorrance.
by Paul & Merwin Attys.

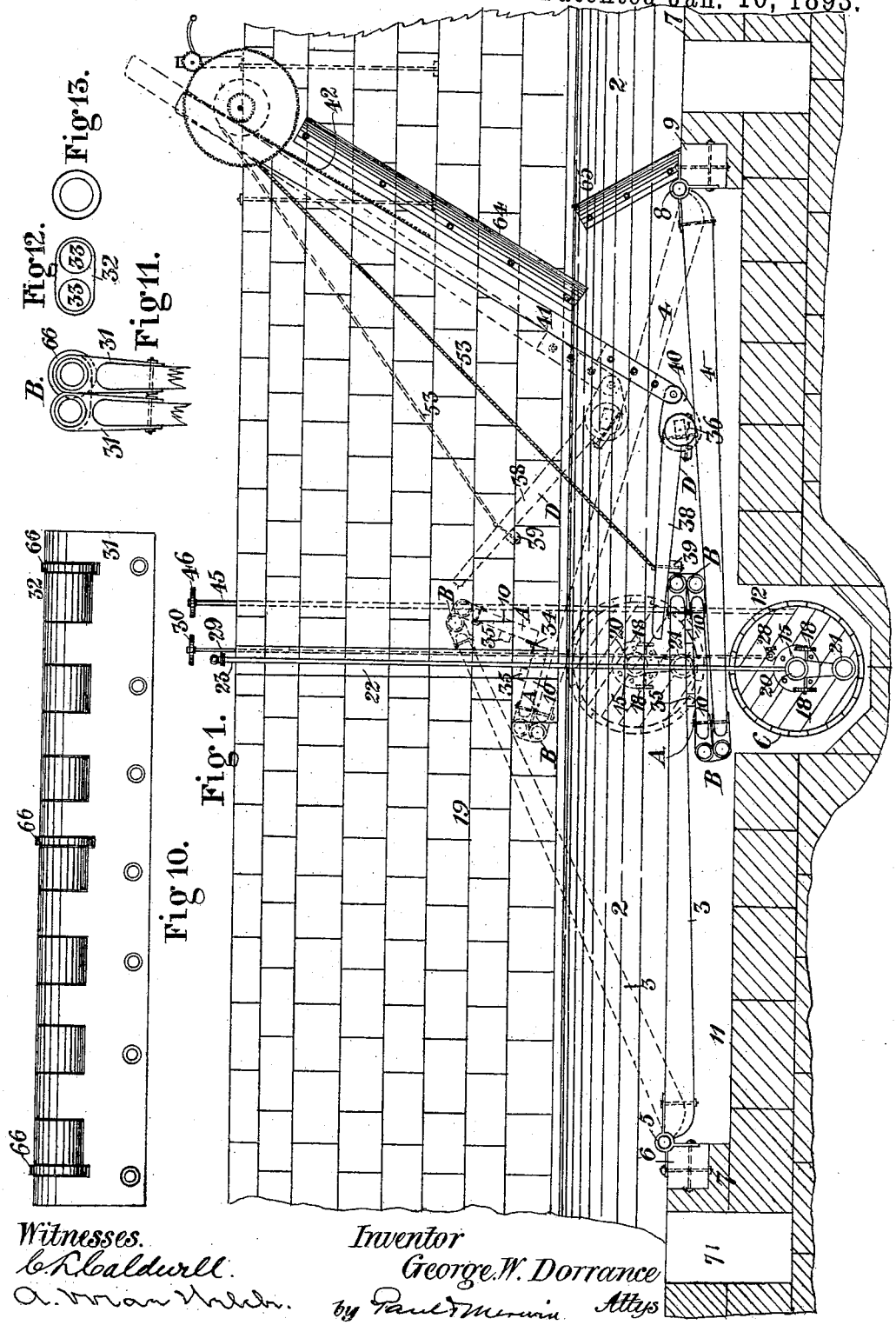

(No Model.) 3 Sheets—Sheet 3.
G. W. DORRANCE.
REVERSIBLE GATE FOR WATER WAYS.
No. 489,557. Patented Jan. 10, 1893.
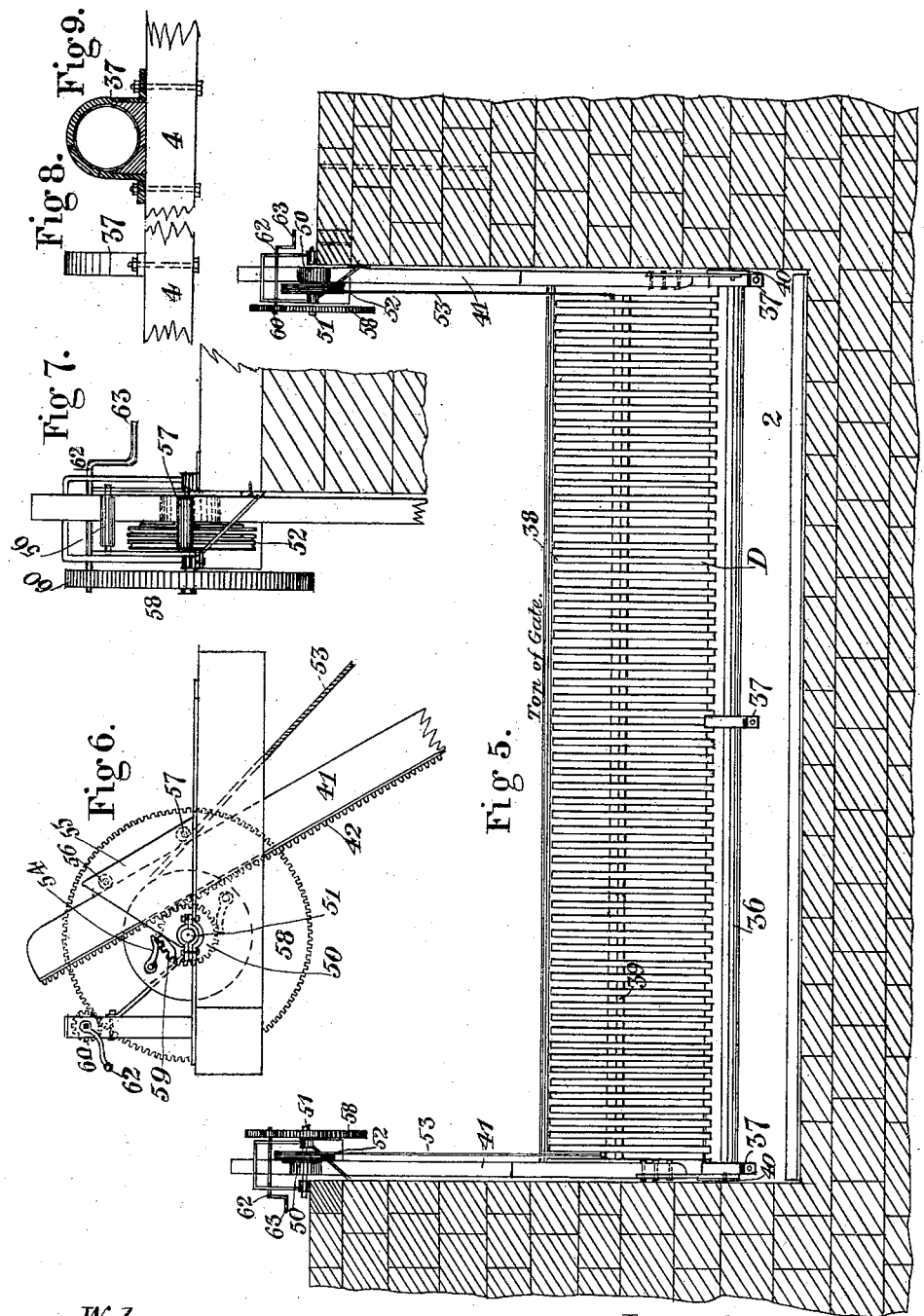
Witnesses
C. R. Caldwell
A. M. Welch
Inventor
George W. Dorrance
by Paul & Merwin Attys.

UNITED STATES PATENT OFFICE.

GEORGE W. DORRANCE, OF ST. PAUL, MINNESOTA.

REVERSIBLE GATE FOR WATER-WAYS.

SPECIFICATION forming part of Letters Patent No. 489,557, dated January 10, 1893.

Application filed November 14, 1891. Serial No. 411,953. (No model.)

*To all whom it may concern:*

Be it known that I, GEORGE W. DORRANCE, of St. Paul, Ramsey county, Minnesota, have invented certain Improvements in Submerged Front and Back Water Gates for Water-Ways, of which the following is a specification.

My invention relates to improvements in submerged gates for use in waterways, its object being to provide an improved form of gate adapted to act as a stop for water flowing in either direction.

In connection with a system of storage reservoirs having a common outlet channel or river course, and at similar places, it often becomes important to have gates arranged in the sluices, by means of which back-water can be prevented from flowing into an empty reservoir,—as for example, when the channel or stream is flooded from the reservoirs above,—as well as to serve as a dam for the water in the reservoir. In the ordinary construction with a single gate hinged at the bottom of the way, adapted to be turned down to the bottom of the way against the head or current, it is often a difficult matter, when the gate is so placed at the bottom, to secure sufficient head or current of water to lift it back into place to act as a dam or stop for the water.

My invention consists in an improved type of gate comprising two similar hinged wings, with their free or top edges or ends flexibly connected together.

Further my invention consists, as a means for automatically lifting the gates when lying at the bottom of the way and covered by dead water or that having so slight a current as to be insufficient of itself alone to lift them, of a barrel or hollow cylinder arranged in a transverse channel at the bottom of the way and underneath the gates, having suitable connections and attachments, by means of which it can be filled either with water, so as to sink it to the bottom of its channel, or with air to give it such buoyancy that it will rise in the water, and lift the gate high enough to be acted upon by the water and serve as a barrier.

My invention further consists in the construction and combination hereinafter described and particularly pointed out in the claims.

In the accompanying drawings forming part of this specification Figure 1 represents a side view of the duplicate wings of my improved gate, showing also the end of the hollow cylinder or barrel arranged underneath them, the abutment wall being removed; Fig. 2 is a side elevation of the cylinder shown in position between the abutments; Fig. 3 is a detail horizontal section of one end of the cylinder showing the anti-friction rolls by which it is held and guided in its vertical movement, Fig. 4 is a sectional detail of the three way valve connecting the water tunnel with the waterway; Fig. 5 is a cross section of the waterway, the open work guard wing or apron protecting the gate being shown in elevation; Fig. 6 is a side elevation of the mechanism for operating the guard wing; Fig. 7 is a front elevation of the same; Figs. 8 and 9 are details of the bearings for the guard wing hinge or gudgeons; Fig. 10 is a detail elevation of one of the double acting hinges of the gate; Fig. 11 is a detail end elevation of the same; Fig. 12 is a detail of the connecting link of the hinge, and Fig. 13 is a detail of one of the anti-friction rolls journaled on the pintles of the hinges.

In the drawings, 2 represents the way or channel in which the duplicate wings 3 and 4 are arranged. The wing 3 is provided with a hinge 5 securing it to the cross timber 6, which lies transversely of the bed 7 of the channel or sluice, the gate 4 having the hinge 8 similarly connecting it to the cross tie or timber 9. These wings are connected at their free edges or ends by means of an intermediate member A, each end of which is connected to a wing by means of a double acting hinge B. The length of the intermediate member, and height of the wings, are such that they will when collapsed fold downward, into the space 11 in the bed of the channel, with the upper wing approximately level with the bed of the channel. Transverse of the channel and midway between the cross timbers 6 and 9, is cut the channel 12. Arranged in this channel is the hollow cylinder C, made preferably of wood to give it the greatest possible buoyancy, and provided with the strap hoops 13, and with a manhole closed by a suitable air tight door 14, by means of which access is given to the interior of the cylinder. Each head of the cylinder is fitted with a central packing box 16 through which passes the pipe 17 serving as the axle of the cylinder. The projecting end of this pipe is fitted with a head 15 having anti friction rolls 18 adapted to bear against the abutment walls 19 of the waterway, and the anti-friction rolls 20 and 21 which run in the vertical groove 22 in the wall 19, the grooves serving as guides for the cylinder in its movement up and down.

Connected with one of the pipes 17 is the vertical pipe 23 which stands in the groove 22 and extends above the top of the wall 19, when the cylinder is resting in its channel, having a hose 24 connecting it to a pump. Connecting with the inner end of the pipe 17 is the downturned pipe 25, the open end of which extends to the bottom of the cylinder. The inner end of the pipe 17 at the other end of the cylinder is fitted with a similar upturned pipe 26 having its open end at the top of the cylinder and a vertical pipe 27 standing in the adjacent guide 22, and connected to the pipe 17 through which air enters to the cylinder as the water is pumped out through the pipe 23. The cylinder is also provided with the valve 28 to which is connected the upright rod 29 having the hand wheel 30, by means of which the valve may be opened from the top of the abutment, to admit water to the cylinder when it is desired to sink the same. The hinges B are made up of the flaps 31, connected by the webs 32, having the openings 33 to receive the pintles, the hinges thus freely turning or folding over in either direction.

The members 10 of the intermediate flap A are provided with the connecting hinge 34. Upon the inner or meeting faces of the members 10 are arranged blocks or projections 35. These blocks being upon the top of the flap when the wings are folded down prevent the upper wing from closing closely against the flap, and with the first upward movement in lifting the wings as herein described, they serve as fulcrums to break the hinge in the flap, and thus facilitate the act of raising.

In order to protect the gate from logs or other floating obstructions, I provide a guard or idler wing D. This guard is made up of the timber or wooden shaft 36, which has journal supports or bearings 37 secured on to the face of the wing 4. The slats 38 are fastened at one end rigidly to the timber 36, and also to the cross bar 39. These slats are arranged parallel with each other and have an open space between, and are of such length that when the gate is closed or folded down the guard wing overlaps the hinges of the gate, and with the opening or raising of the gate, the guard serves as a fender to protect the hinges and intermediate flap from obstructions, as shown by the dotted lines in Fig. 1. The guard wing is operated preferably by means of cranks 40 arranged at each end, to which are pivotally connected the timbers 41, which extend upward along the side walls of the channel. These timbers are provided with the racks 42 which engage the pinions 50 mounted loosely upon the shaft 51, which has suitable journal support at the top of the abutment. Secured upon the shaft 51 is the grooved drum 52 around which is wound the cable 53, which extends downward and is connected to the guard wing, at or near its upper edge, as shown in Fig. 1. The drum is connected to the pinion by means of the pawl 54 engaging the teeth of the ratchet 59 so as to be rotated in one direction with the pinion. With the lifting of the gate, the timber 41 is carried upward, thus turning the pinion and the shaft with the drum 52, which bears such relation in size to the pinion that it will wind up the cable 53 fast enough to turn the guard wing upward into the position shown by the dotted lines in Fig. 1. The timber 41 is held in positive engagement with the pinion by means of the yoke 55 pivoted upon the shaft 51, and surrounding the timber, and provided with anti-friction rolls 56 and 57 which bear upon the outer face of the timber and hold the rack at all times against the pinion.

In order that the guard wing can be raised or lowered by hand, when the gate is closed, I provide the gear wheel 58 secured upon the shaft 51. With this gear wheel meshes the pinion 60 mounted upon the crank shaft 62 which is provided with a handle 63. It will thus be seen that by turning this handle the drum 52 may be turned to wind upon the cable 53 and turn the guard wing upward, or by reverse motion to lower the guard wing when raised. The timbers 41 are protected from floating logs by means of the guard timbers 64 and 65 bolted on to the face of the abutment wall as shown.

To decrease the friction between the hinges B, and the bearing surfaces of the wings, I provide upon the pintles of the hinges anti-friction rolls 66 upon which the wings rest.

Connecting the way or channel outside the wings with the space under and between the wings, is the tunnel 71 opening at each end into the channel and connecting with the channel between the wings through the outlet 43. Arranged at the junction of the outlet 43 with the tunnel, is a three way gate or valve 44, of ordinary and well known construction, by means of which the water may be admitted or discharged from either end of the tunnel. This gate is turned by means of a rod 45 extending upward in the open vertical shaft 49 in the wall of the channel, and provided with a hand wheel 46 at the top by means of which it may be operated. The shaft 49 furnishes access to the gate, the shaft being large enough to allow the gate to be hoisted out through it when necessary for repairs.

Operation. The wings being collapsed and folded down into the position shown by the full lines in Fig. 1, and covered by the body of nearly dead or currentless water, and the cylinder A being filled with water and lying in its channel 12, the pump connected to the hose 24 is operated, and the water drawn out of the cylinder air entering to take its place through the pipes 27 and 26. The cylinder as it becomes filled with air rises, striking against the under wing 4 rolling upon its surface and lifting it, carrying the intermediate member A upward against the upper wing, thereby breaking the hinge 34 downward. With the continued upward movement of the cylinder, the hinge 34, as well as the hinge B of the upper wing opens, as indicated by the dotted lines. The wing 4 in its upward movement carries upward also the guard wing D and its bars or timbers 41, which cause the pinions 50 and the drums 52 to rotate thereby winding up the cable 53, and turning the guard wing on its gudgeons or shaft into the position indicated by the dotted lines in Fig. 1. The timbers 41 also serve to assist in the turning upward of the guard wing by their downward thrust upon the cranks 40. The handle 46 being turned to open the gate 44 and admit water through the tunnel from the direction of the current, the water between the wings, gradually rises on a level with that on the side from which it enters, and above that on the other or outer side. The pressure of this head tends to turn the outer wing outward, straightening the jointed connection of the intermediate member between them, which thus serves as a stay for the top of the wing and holds it against the head or pressure, thus closing the channel. When it is desired to collapse or open the gate, the valve 28 is opened by means of the hand wheel 30, thus admitting water into the pipe 23, whence it flows into the cylinder, expelling the air contained therein through the pipes 26 and 27. The gate 44 being turned to allow the water between the wings to flow out through the tunnel, the wings then of their own weight collapse and sink into the water of the sluice, returning to the position shown by the full lines in Fig. 1. The timbers 41 traveling downward and reversing the rotation of the pinion and drum, thus allowing the guard wing to turn downward and be submerged with the gate. The barrel or cylinder when filled with air and bearing against the gate in its closed or raised position, serves also to support the gate or its outer wing against backwater, or if used in connection with the ordinary form of single wing gate, will support it in similar manner, its buoyancy counteracting the pressure of the backwater and preventing the wing from being crowded down by the force of the water. This cylinder is therefore a valuable attachment for the ordinary type of gate, both for the purpose of raising or closing it when there is insufficient current, and also to support it against backwater.

I disclaim broadly, "a reversible bear-trap or folding hydraulic weir, having side leaves, and an intermediate leaf connecting the upper ends of the said leaves, whereby the weir will maintain its position against an excess of water pressure on either side."

I do not claim a reversible water gate made up of a pair of side leaves and an intermediate leaf connecting their upper ends, but the foregoing described construction of double gate with the specific construction of intermediate connection.

I claim—

1. In a device of the class described, the combination with the hinged wing, of the hollow cylinder or barrel arranged transversely of the way underneath the wing, but independent thereof, and means for admitting air and water to, and exhausting them from said cylinder, substantially as described.

2. The combination with the hinged wing, of the hollow cylinder arranged transversely underneath, but independent of said wing, guides directing the vertical movement of said cylinder, and air and water inlets and outlets for said cylinder, substantially as described.

3. In a device of the class described, the combination with the waterway and the transversely hinged, flexibly connected wings, of the transverse channel beneath the same, the hollow cylinder arranged in said channel, the anti friction rolls upon the ends of said cylinder adapted to bear against the walls of the way, vertical grooves in said walls, anti friction rolls carried by said cylinder and bearing against the side walls of said grooves, an open end stand pipe arranged in one of said grooves communicating with the cylinder at or near its top and a stand pipe arranged in the other groove communicating with said cylinder near its bottom and connected to a pump, substantially as described.

4. The combination with the waterway, of the duplicate wings hinged at the bottom of the way, an intermediate hinged member or flap, and double acting hinges connecting said flap with the tops of the wings, substantially as described.

5. The combination with the waterway, of the duplicate wings hinged at the bottom of the way, an intermediate folding flap connected to the tops of the wings by double acting hinges, and means for automatically raising said wings in dead water, substantially as described.

6. The combination with the waterway, of a submerged gate therefor, having duplicate hinged wings, an intermediate folding flap connected to the top of the wings by double acting hinges, and a guard wing hinged to one of said wings and projecting upward to protect said flap and hinges, substantially as described.

7. The combination with a submerged water gate, of a hollow cylinder or barrel arranged underneath and transversely thereof, means for admitting air or water to said barrel, and vertical guides therefor, substantially as described.

8. The combination with the submerged water gate having duplicate wings flexibly connected together by an intermediate folding flap, of a guard wing hinged upon one of said wings, and adapted to be turned upward on its hinges to serve as a fender for the connections at the top of said wings, substantially as described.

9. The combination with the submerged water gate, of means for hoisting the same in dead water, comprising in combination a barrel or hollow cylinder arranged transversely of the way underneath, but independent of, said gate, and means for filling the same at will with water or air, substantially as described.

10. The combination with the submerged water gate, of the hollow cylinder arranged transversely beneath the same, and having journal support at each end, vertical guides for said cylinder, a water pipe communicating with the bottom of the cylinder, and an air pipe connecting its top, substantially as described.

11. The combination with the submerged water gate, of the hollow cylinder arranged transversely beneath the same, vertically sliding journal supports for the ends of the barrel, and means for filling the cylinder with air or water, and for exhausting the same from it, substantially as described.

12. The combination with the submerged water gate, of a hollow cylinder arranged transversely beneath the same, pipe axles for the ends of the cylinder, anti friction rolls carried by said axles making bearing contact with the walls of the water way against lateral and longitudinal movement of the cylinder, an air pipe connecting with one of the pipe axles and communicating with the cylinder near its top, a water pipe connected with the other axle and communicating with the cylinder near its bottom a pump connected to said water pipe for exhausting the water from said cylinder, and means for admitting water to said cylinder, substantially as described.

13. The combination with the submerged water gate, of the water tunnel connecting with the water way on each side of the gate, an outlet for said tunnel communicating with the way between the wings of the gate, and a three way gate or valve connecting said tunnel with its outlet, substantially as described.

14. In a submerged water gate, the combination with the wings hinged transversely at the bottom of the way and flexibly connected together at the top, of a guard wing hinged upon one of said wings and overlapping said flexible connection, cables connected to said guard wing at or near its top, winding drums for said cables and means for rotating said drums, substantially as described.

15. In a device of the class described, means for raising the gate and supporting it against backwater, consisting of a hollow cylinder or barrel arranged underneath, but independent of the gate, means for holding it in bearing contact with the gate and means for supplying it at will with air or water, substantially as described.

16. In a submerged watergate, the combination with the duplicate wings hinged at the bottom of the way and having their tops flexibly connected together, of a guard wing hinged upon one of said wings and projecting over said flexible connection, cranks upon the hinge of said guard wing, and upright bars connected to said cranks, and also so connected with the abutment walls above that the downward thrust of said bars caused by the rising of the gate tends to turn the guard wing upward, substantially as described.

17. In a submerged water gate, the combination with the wings hinged at the bottom of the way and flexibly connected together at their top, of a guard wing hinged upon one of the gate wings and extending toward its top, cranks upon the hinge of said guard wing, upright rack bars connected to said cranks, pinions engaged by said racks, drums connected to and rotated by said pinions, and cables upon said drums connected to said guard wing at or near its top, substantially as described.

18. In a water gate having a pair of hinged wings, and an intermediate flap, the double acting hinges connecting said flap to the respective tops of said wings, comprising in combination the two members or webs, and the intermediate solid web hinged thereto, substantially as described.

19. In a water gate the combination with a pair of wings hinged at the bottom of the way and the intermediate flap, of the double acting hinges connecting said flap with the tops of said wings, each comprising in combination the pair of similar members, their pintles, and the intermediate solid web turning upon said pintles, substantially as described.

In testimony whereof I have hereunto set my hand this 23d day of September, 1891.

GEORGE W. DORRANCE.

In presence of—
 T. D. MERWIN,
 A. MAE WELCH.